United States Patent
Wihinen

(10) Patent No.: US 8,328,238 B2
(45) Date of Patent: Dec. 11, 2012

(54) STEERING WHEEL ASSEMBLY

(75) Inventor: Kimmo Wihinen, Laukaa (FI)

(73) Assignee: Valtra Oy Ab, Suolahti (FI)

( * ) Notice: Subject to any disclaimer, the term of this patent is extended or adjusted under 35 U.S.C. 154(b) by 101 days.

(21) Appl. No.: 13/058,911

(22) PCT Filed: Aug. 3, 2009

(86) PCT No.: PCT/IB2009/006422
§ 371 (c)(1),
(2), (4) Date: Feb. 28, 2011

(87) PCT Pub. No.: WO2010/020848
PCT Pub. Date: Feb. 25, 2010

(65) Prior Publication Data
US 2011/0187090 A1  Aug. 4, 2011

(30) Foreign Application Priority Data
Aug. 22, 2008  (GB) .................................. 0815317.3

(51) Int. Cl.
*B62D 1/16* (2006.01)
(52) U.S. Cl. ...................................................... 280/779
(58) Field of Classification Search .................. 280/779; 74/552
See application file for complete search history.

(56) References Cited

U.S. PATENT DOCUMENTS

| | | | |
|---|---|---|---|
| 3,643,606 A * | 2/1972 | Vise | 108/44 |
| 6,412,425 B1 | 7/2002 | Chen | |
| 2006/0289576 A1 | 12/2006 | Krusell | |

FOREIGN PATENT DOCUMENTS

| | | |
|---|---|---|
| EP | 0992395 A3 | 12/2000 |
| JP | 60161248 A | 8/1985 |

OTHER PUBLICATIONS

UK Search Report for British Application No. GB0815317.3, Nov. 25, 2009.

* cited by examiner

*Primary Examiner* — Faye M. Fleming

(57) ABSTRACT

A steering wheel assembly (20) comprising a steering wheel (22) rotatably mounted to a support body (24) is provided. The support body, or console unit, is rotatable about an axis which is substantially transverse between a steering position for steering the vehicle and a table position in which one upward facing surface (28) of the support body provides a table. Advantageously, a surface of the support body to which the steering wheel is mounted is exploited to provide an additional surface for the driver (35) when the vehicle is not in operation.

10 Claims, 4 Drawing Sheets

STEERING WHEEL ASSEMBLY

The invention relates to a steering wheel assembly and particularly, but not exclusively so, to a steering wheel assembly for a utility vehicle such as an agricultural tractor.

It is an object of the invention to provide a steering wheel assembly with increased functionality.

In accordance with the invention there is provided a steering wheel assembly comprising a steering wheel rotatably mounted to a support body which is rotatable about a substantially transverse axis between a first position for steering the vehicle and a second position in which one upward facing surface of the support body provides a table.

By mounting the steering wheel on a support body which is itself rotatable the underside of the support body can be exploited to provide a working surface for the driver.

Preferably the steering wheel is mounted to a face of the support body which serves as a dash board having at least one display element.

In a preferred embodiment the steering wheel assembly is implemented in a utility vehicle. In such vehicles drivers typically spend a large proportion of their day in the cab especially during harvest time and/or when working far away from their home or office. Therefore, the driver is often required to consume their meals within the protection offered by the vehicle cab. Space within such cabs is often at a premium and in any case any surface is often covered with dirt. Therefore the table provided in accordance with the invention is particularly advantageous in such an environment.

Furthermore, the invention exploits recent developments in steering control wherein a direct mechanical connection between the steering wheel and the steering mechanism is no longer required. Such mechanical detachment facilitates the ability to rotate the steering wheel and support body in accordance with the invention.

It will be appreciated that the table provided by the underside of the support body can be exploited for a number of different uses including resting a laptop computer thereupon.

In a first preferred embodiment of the invention implemented in a utility vehicle the steering wheel assembly comprises a pillar structure fixed to a cab floor, the support body being rotatably mounted to the pillar structure. The support body may be mounted to the pillar structure at a single point or, alternatively, at a pair of points on opposite sides of the support body wherein the pillar structure comprises an upper fork portion having two branches one for each mounting point.

In a second preferred embodiment of the invention implemented in a utility vehicle the support body is mounted to an arm rest assembly located and affixed to one side of the driver's seat. Advantageously this leaves the floor space in front of the driver's feet clear of any support structure and thus providing more leg room. Preferably the arm rest assembly comprises a consol having at least one user interface thus making use of the available surfaces presented to a driver.

The connection between the steering wheel support body and the driver's seat is particularly advantageous in the case wherein the driver's seat is mounted on a rotatable platform on a cab floor. Therefore, the steering wheel rotates with the seat which is particularly advantageous in forestry applications for example, wherein the driver is often required to face rearwards to control rear-attached implements.

In a third preferred embodiment of the invention implemented on a utility vehicle the support body is mounted to arms extending from a front or side face of a cab. Such an arrangement also carries the benefit of increased leg room for the driver due to the absence of any support structure affixed directly to the cab floor.

Further advantages of the invention will become apparent from the following description of specific embodiments with reference to the appended drawings in which.

Figure 1:
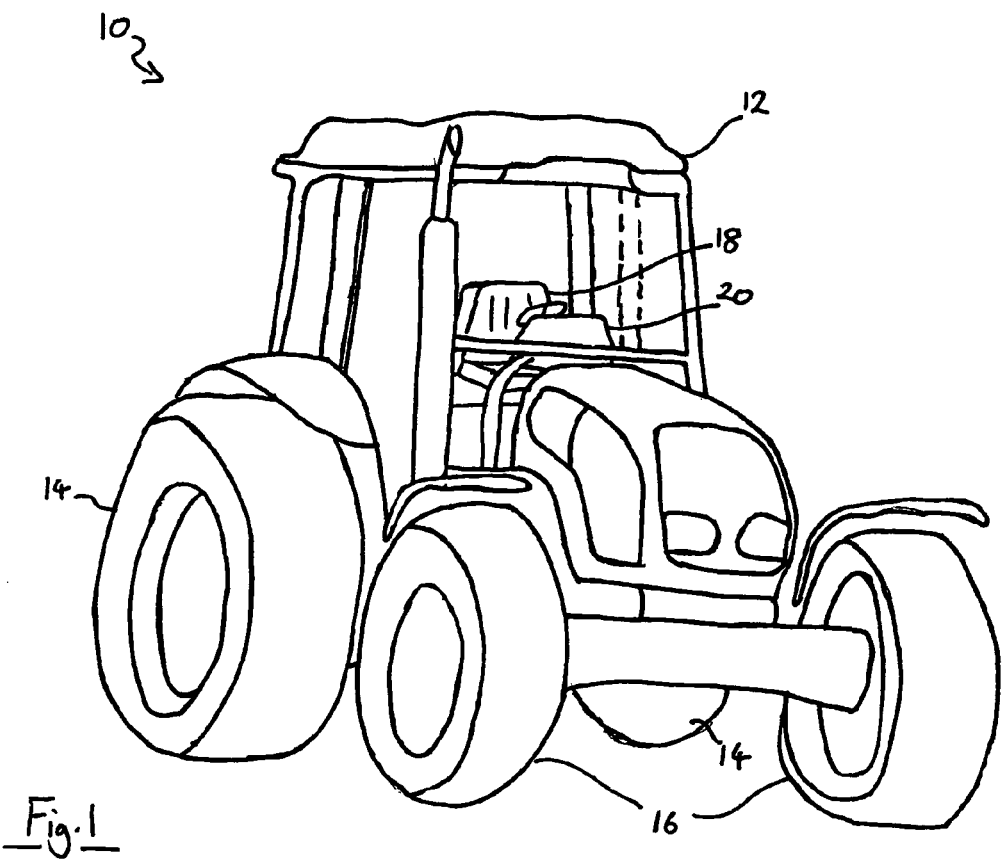
FIG. 1 is a perspective view of a tractor comprising a steering assembly in accordance with a first embodiment of the invention.

With reference to FIG. 1 a first embodiment of the invention comprises a tractor 10 which includes a steering wheel assembly 20. The tractor 10 comprises a cab 12, a pair of rear wheels 14 and a pair of steerable front wheels 16. In addition to the steering wheel assembly 20 the cab 12 also houses a driver's seat 18 from which the driver operates the vehicle.

Figure 2:
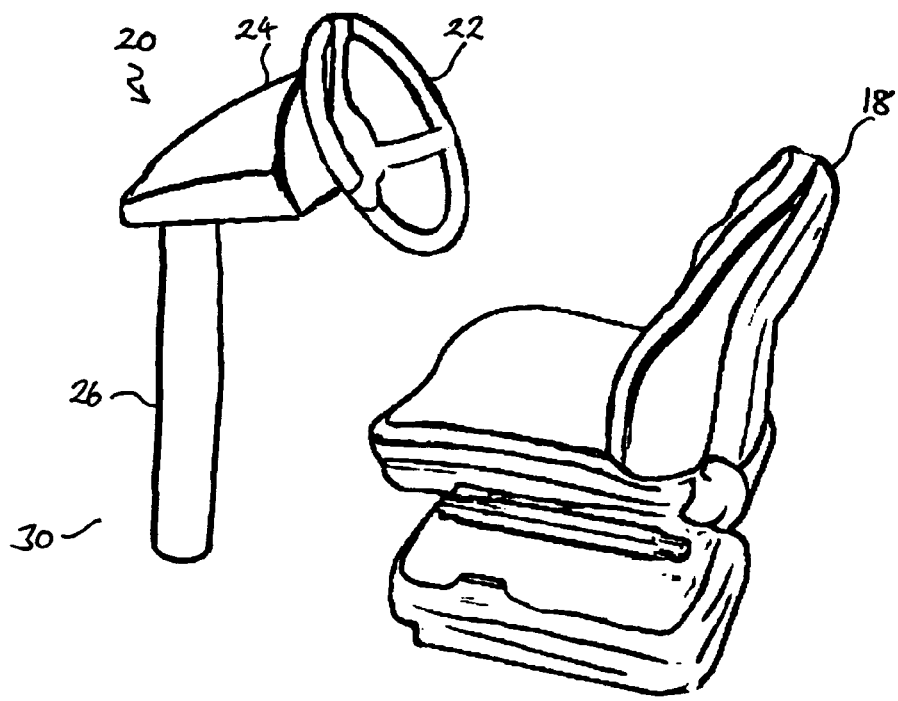
FIG. 2 is a perspective view of a the left hand side of the steering assembly and driver's seat of FIG. 1.
Figure 3:
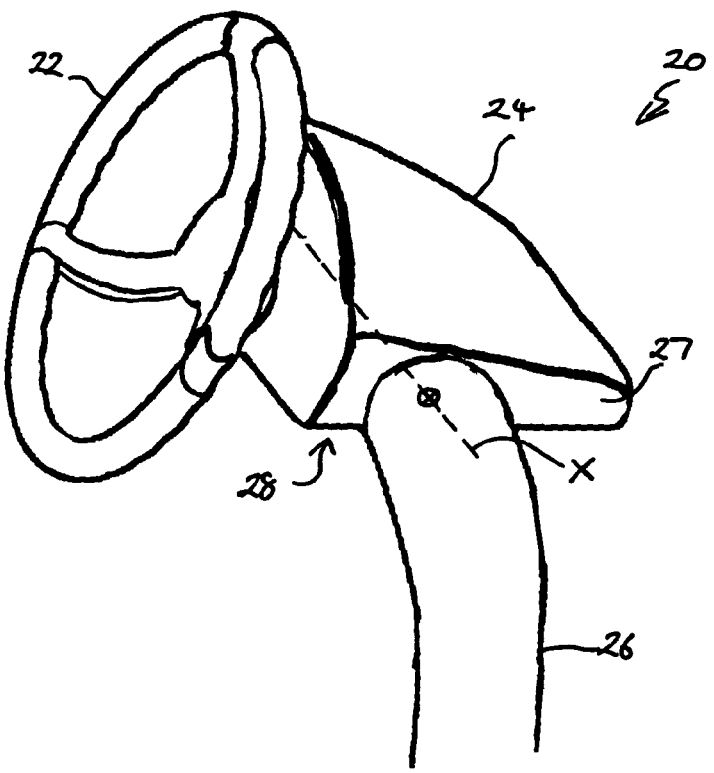
FIG. 3 is a perspective view of the right hand side of the steering assembly of FIG. 1 shown in a steering position.

With reference to FIGS. 2 and 3 the steering wheel assembly 20 comprises a steering wheel 22 rotatably mounted to a support body 24. The rotation of the steering wheel 22 is sensed by electronic sensing means (not shown) which serves to translate the rotational motion of the steering wheel into an electrical signal which is communicated to a steering control unit located elsewhere on the tractor 10. This electrical signal is then interpreted and translated into movement of the steerable front wheels 16.

Figure 4:
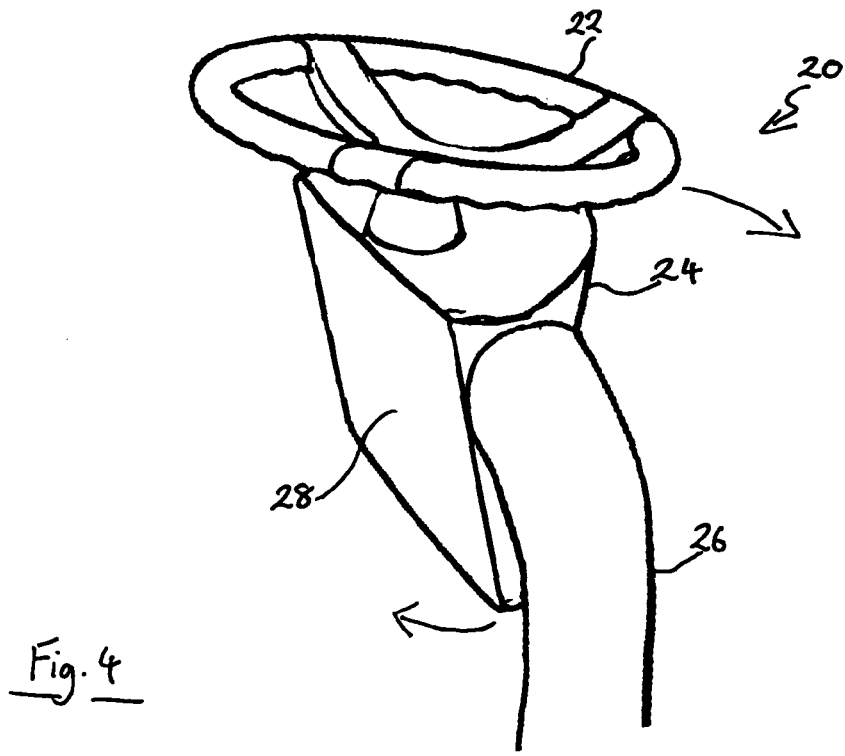
FIG. 4 is a perspective view of the steering assembly of FIG. 1 shown in an intermediate position.
Figure 5:
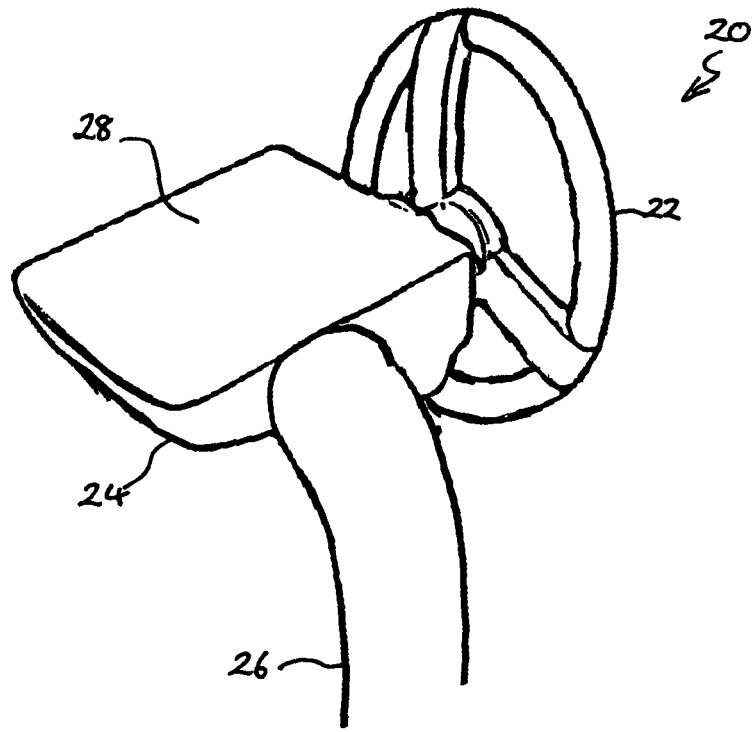
FIG. 5 is a perspective view of the steering assembly of FIG. 1 shown in a table position.
Figure 6:
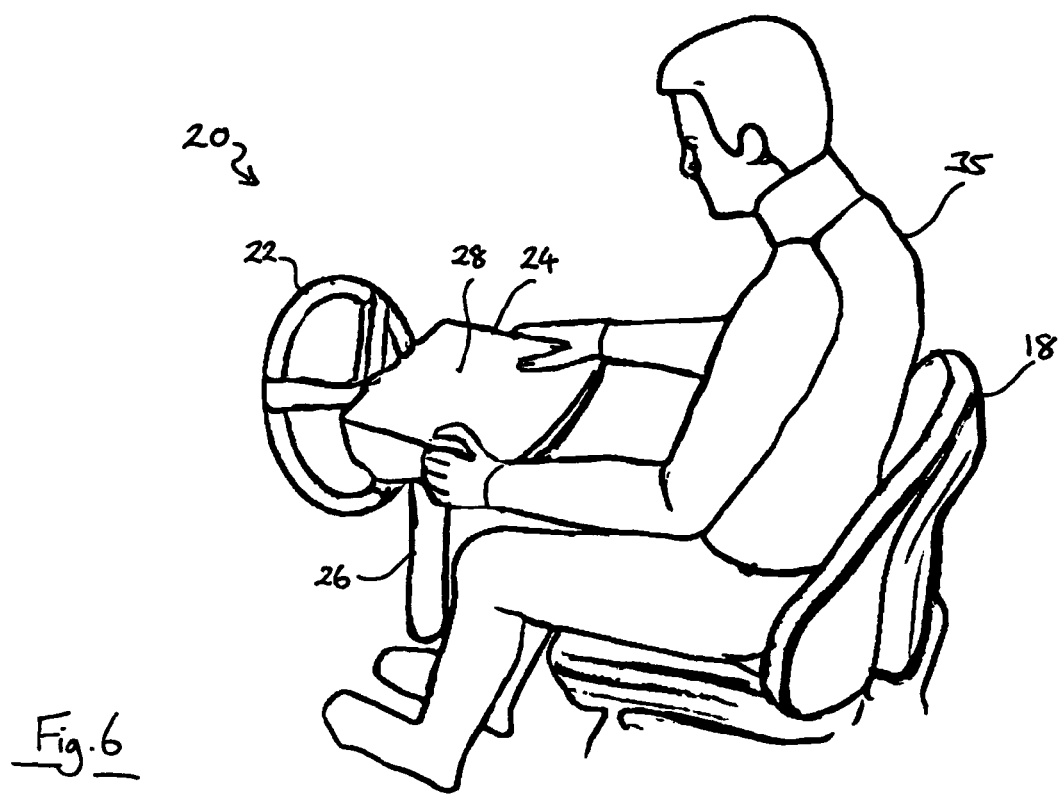
FIG. 6 is a perspective view of the steering assembly of FIG. 1 shown in the table position and with a driver sitting on a driver's seat.

The steering assembly 20 further comprises a pillar 26 which is fixed to the cab floor 30. At its upper end the pillar 26 is fixed to a side face 27 of the support body 24. The support body 24 and pillar 26 are mounted together so as to allow rotation of the support body 24 about an axis X which is substantially transverse to the forward direction of the tractor 10. The rotatable fixing employs known technology such as a simple shaft rotatable and held in place within a bore for example. The support body is therefore rotatable between a first position suitable for steering the vehicle as shown in FIGS. 2 and 3, through an intermediate position (FIG. 4) to a position in which the underside 28 of the support body 24 is upward facing so as to provide a table as shown in FIGS. 5 and 6. The support body 24 is locked in the steering position of FIG. 3 and the table position of FIG. 5 by releasable locking means (not shown).

The steering console 24 can therefore be simply flipped between a steering position and a table position. By exploiting the underside of the support body 24 to provide a table an extra surface is provided for a driver 35 to rest his lunch upon for example (FIG. 6).

It will be appreciated that a safety mechanism is included to prevent movement or even starting of the tractor 10 when the support body 24 is not in the steering position. Therefore it is envisaged that the releasable locking means to move the support body away from the steering position may include an electrically activate solenoid for example which prevents such unlocking when the vehicle is in motion.

In an alternative arrangement which is not illustrated in the drawings the pillar 26 comprises an upper fork portion having two branches, one to the left and one to the right. The support body 24 is mounted at respective mounting points located on the side faces thereof and connected to the branches of the pillar structure. Advantageously, this provides a more sturdy structure in which the support body 24 is held in place by two mounting points.

Figure 7:
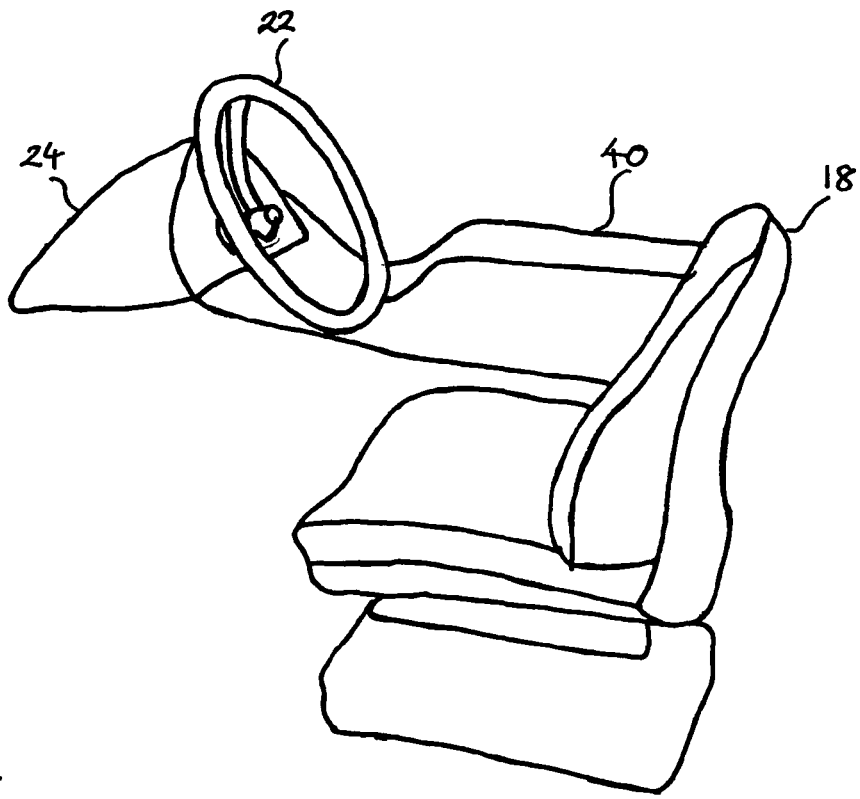
FIG. 7 is a perspective view of a steering assembly and driver's seat in accordance with a second embodiment of the invention.

In a second embodiment shown in FIG. 7, the support body 24 is mounted to an arm rest assembly 40 located and affixed to the right hand side of driver's seat 18. In a similar manner to the first embodiment the support body is rotatably mounted to the forward end of the arm rest assembly 40 so as to provide a steering position (as shown in the drawing) and a table position. In the absence of a pillar structure this embodiment advantageously provides increased leg room for a driver.

Figure 8:
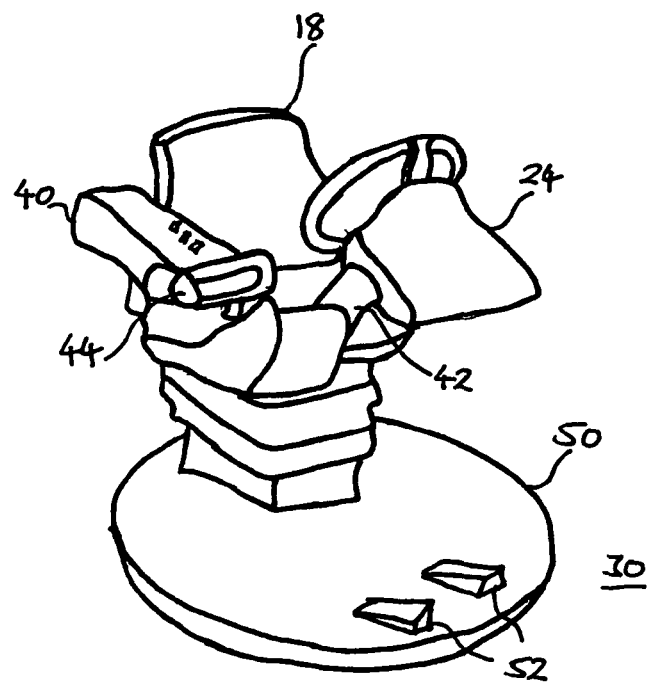
FIG. 8 is a perspective view of a steering assembly and driver's seat in accordance with a third embodiment of the invention.

In a third embodiment as shown in FIG. 8 the support body 24 is again mounted to a forward end of an arm rest 40 by a connecting member 42 about which the support body is rotatable. The arm rest assembly 40 comprises a console having a joystick 44 which exploits the available surface area provided by the arm rest assembly 40. However, it will be appreciated that the armrest could accommodate many more user interface devices such as levers and buttons for example.

The driver's seat 18 is mounted on a rotatable platform 50 which is fixed to the cab floor 30. The provision of the steering wheel assembly being mounted to the arm rest 40 in combination with a rotating platform 50 delivers a unitary driver's station which can rotate potentially through 360°. Advantageously this removes the need for multiple steering wheel assemblies located at the forward and rearward ends of the cab as provided in known forestry tractors. Furthermore the rotating platform can be provided with pedals 52 for the control of the vehicle wherein such pedals rotate with the driver's station.

In an alternative embodiment not illustrated in the drawings the support body 24 is mounted to arms which extend from a front or side face of the cab. Such an arrangement also delivers increased leg room for a driver 35 whilst also providing a table in accordance with the invention.

Although the invention has been described above in relation to a tractor it is envisaged that the steering assembly can instead be implemented on any utility vehicle without deviating from the scope of the invention.

Furthermore it should be understood that any electrical connections to the steering wheel sensor and any display element located on the dashboard 24 can be routed through the supporting means such as the pillar 26 or armrest 40.

The steering wheel 22 may be detachable from the support body 24 to allow for rotation to the table position in a more restricted space, for example in the case where the steering wheel would otherwise collide with the windscreen.

Although the underside of the support body 24 is employed for the table surface in the above embodiments, it is envisaged that other surfaces could instead be exploited by suitable design of the shape and configuration of the console.

In summary there is provided a steering wheel assembly comprising a steering wheel rotatably mounted to a support body. The support body, or console unit, is rotatable about an axis which is substantially transverse between a steering position for steering the vehicle and a table position in which one upward facing surface of the support body provides a table. Advantageously, a surface of the support body to which the steering wheel is mounted is exploited to provide an additional surface for the driver when the vehicle is not in operation.

From reading the present disclosure, other modification will be apparent to persons skilled in the art. Such modifications may involve other features which are already known in the field of steering assemblies and component parts therefore and which may be used instead of or in addition to features already described herein.

The invention claimed is:

1. A steering wheel assembly comprising a steering wheel rotatably mounted to a support body which is rotatable about a substantially transverse axis between a first position for steering the vehicle and a second position in which one upward facing surface of the support body provides a table.

2. A steering wheel assembly according to claim 1, wherein the steering wheel is mounted to a face of the support body which serves as a dashboard having at least one display element.

3. A utility vehicle comprising a steering wheel assembly according to claim 1.

4. A utility vehicle according to claim 3, wherein the steering wheel assembly comprises a pillar structure fixed to a cab floor, the support body being rotatably mounted to the pillar structure.

5. A utility vehicle according to claim 4, wherein the support body is mounted to the pillar structure at a single point.

6. A utility vehicle according to claim 4, wherein the pillar structure comprises an upper fork portion having two branches, the support body being mounted at respective mounting points located on opposite sides thereof to the branches.

7. A utility vehicle according to claim 3, wherein the support body is mounted to an armrest assembly located and affixed to one side of a driver's seat.

8. A utility vehicle according to claim 7, wherein the armrest assembly comprises a console having at least one user interface.

9. A utility vehicle according to claim 7, wherein the driver's seat is mounted on a rotatable platform on a cab floor.

10. A utility vehicle according to claim 3, wherein the support body is mounted to arms extending from a front or side face of a cab.

* * * * *